US012529453B2

(12) United States Patent
Shao et al.

(10) Patent No.: US 12,529,453 B2
(45) Date of Patent: Jan. 20, 2026

(54) METHODS AND INTERNET OF THINGS (IoT) SYSTEMS FOR PROCESSING ABNORMALITY OF SMART GAS PIPELINE NETWORK

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yuefei Wu, Chengdu (CN); Bin Liu, Chengdu (CN); Guanghua Huang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 688 days.

(21) Appl. No.: 18/051,005

(22) Filed: Oct. 30, 2022

(65) Prior Publication Data

US 2023/0079768 A1   Mar. 16, 2023

(30) Foreign Application Priority Data

Oct. 8, 2022   (CN) .......................... 202211222298.1

(51) Int. Cl.
*F17D 5/06*    (2006.01)
*F17D 3/18*    (2006.01)
(Continued)

(52) U.S. Cl.
CPC ............... *F17D 5/005* (2013.01); *F17D 5/06* (2013.01); *F17D 3/18* (2013.01); *G01D 18/00* (2013.01);
(Continued)

(58) Field of Classification Search
None
See application file for complete search history.

(56) References Cited

U.S. PATENT DOCUMENTS 10,616,667 B1 *   4/2020   Shao .................. G06F 16/903
2012/0090414 A1 *   4/2012   Kearns .................. F16L 55/46
15/104.062
(Continued)

FOREIGN PATENT DOCUMENTS

CN   202093375 U   * 12/2011   .............. Y02P 90/02
CN   105156906 A   * 12/2015   .............. Y02P 90/02
(Continued)

OTHER PUBLICATIONS

Kim et al., "Multiple leak detection algorithm for pipe network", Mar. 2019, Mechanical Systems and Signal Processing 139 (2020) 106645. (Year: 2019).*

(Continued)

*Primary Examiner* — Mohammad Ali
*Assistant Examiner* — Kelvin Booker
(74) *Attorney, Agent, or Firm* — METIS IP LLC

(57) ABSTRACT

The embodiments of present disclosure provide a method for processing abnormality of a smart gas pipeline network implemented based on a smart gas safety management platform of a safety management Internet of Things (IoT) system for the smart gas pipeline network. The method may include: obtaining detection information of a gas pipeline in a target area; determining an abnormal pipeline in the target area based on the detection information; and determining an abnormality handling scheme based on the detection information corresponding to the abnormal pipeline.

14 Claims, 6 Drawing Sheets

(51) Int. Cl.
*F17D 5/00* (2006.01)
*G06F 16/90* (2019.01)
*G06Q 10/06* (2023.01)
*G06Q 50/06* (2024.01)
*G01D 18/00* (2006.01)
*G06F 16/903* (2019.01)
*G08B 7/06* (2006.01)

(52) U.S. Cl.
CPC ........... *G06F 16/903* (2019.01); *G06Q 10/06* (2013.01); *G06Q 50/06* (2013.01); *G08B 7/06* (2013.01)

(56) References Cited

U.S. PATENT DOCUMENTS

| | | | | |
|---|---|---|---|---|
| 2014/0130878 | A1* | 5/2014 | Marinez | F17D 3/01 |
| | | | | 137/487.5 |
| 2016/0238257 | A1* | 8/2016 | Huang | F23N 5/242 |
| 2019/0093829 | A1* | 3/2019 | Andrew | F16L 55/26 |
| 2020/0309632 | A1* | 10/2020 | Shao | G01D 18/00 |
| 2021/0087918 | A1* | 3/2021 | Wang | E21B 47/08 |
| 2021/0396124 | A1* | 12/2021 | Harrison | H04L 67/12 |

FOREIGN PATENT DOCUMENTS

| | | | | | |
|---|---|---|---|---|---|
| CN | 107146385 | A | * | 9/2017 | ............ F17D 3/01 |
| CN | 107862836 | A | * | 3/2018 | ........... F16K 31/02 |
| CN | 108332056 | A | * | 7/2018 | ............ F17D 3/01 |
| CN | 109611695 | A | * | 4/2019 | ............ F17D 5/06 |
| CN | 110375830 | A | * | 10/2019 | ............ B07C 5/361 |
| CN | 210006184 | U | * | 1/2020 | ............ F17D 5/06 |
| CN | 110867053 | A | * | 3/2020 | ........ H04M 1/72415 |
| CN | 111104989 | A | | 5/2020 | |
| CN | 111327706 | A | * | 6/2020 | ........... G06F 18/214 |
| CN | 111915579 | A | | 11/2020 | |
| CN | 212321567 | U | * | 1/2021 | ............ G08B 7/06 |
| CN | 113090954 | A | * | 7/2021 | ............ F17D 5/06 |
| CN | 113723834 | A | * | 11/2021 | ............ F17D 3/01 |
| CN | 113804826 | A | * | 12/2021 | ............ G08B 7/06 |
| CN | 216351829 | U | * | 4/2022 | ........... G06F 16/903 |
| CN | 114542988 | A | * | 5/2022 | ............ F17D 5/005 |
| CN | 114580129 | A | * | 6/2022 | ............ F17D 3/18 |
| TH | 2101002909 | A | * | 7/2022 | ........... G06F 16/903 |

OTHER PUBLICATIONS

Wong et al., "A minimalist approach for detecting sensor abnormality in oil and gas platforms", Aug. 2021, Petroleum Research 7 (2022) 177e185. (Year: 2021).*
Tian et al., "Leakage detection of low-pressure gas distribution pipeline system based on linear fitting and extreme learning machine", Mar. 2021, International Journal of Pressure Vessels and Piping 194 (2021) 104553. (Year: 2021).*
Zaman et al., "A review of leakage detection strategies for pressurised pipeline in steady-state", Jan. 2019, Engineering Failure Analysis 109 (2020) 104264. (Year: 2019).*
Enemosah, A., "Intelligent Decision Support Systems for Oil and Gas Control Rooms Using Real-Time AI Inference", Dec. 2021, International Journal of Engineering Technology Research & Management, vol. 05 Issue 12. (Year: 2021).*
Priyanka et al., "Review analysis on cloud computing based smart grid technology in the oil pipeline sensor network system", Aug. 2020, Petroleum Research. (Year: 2020).*
Enemosah et al., "Next-Generation SCADA Architectures for Enhanced Field Automation and Real-Time Remote Control in Oil and Gas Fields", 2022, International Journal of Computer Applications Technology and Research vol. 11—Issue 12, 514-529. (Year: 2022).*
Ali et al., "SimpliMote: A Wireless Sensor Network Monitoring Platform for Oil and Gas Pipelines", Mar. 2018, IEEE Systems Journal, vol. 12, No. 1. (Year: 2018).*
Spandonidis et al., "A Combined Semi-Supervised Deep Learning Method for Oil Leak Detection in Pipelines Using IIoT at the Edge", May 2022, Sensors, 22, 4105. (Year: 2022).*
He et al., "A framework of smart pipeline system and its application on multiproduct pipeline leakage handling", May 2019, Energy 188, 116031. (Year: 2019).*
Korlapati et al., "Review and analysis of pipeline leak detection methods", Mar. 2022, Journal of Pipeline Science and Engineering 2, 100074. (Year: 2022).*
First Office Action in Chinese Application No. 202211222298.1 mailed on Jul. 30, 2025, 19 pages.
Liu, Zhiyang, Quantitative Risk Assessment Technology of Town Gas Pipeline, China Excellent Master's Dissertation Full-Text Database Engineering Technology II , 2019, 108 pages.
Zhang, Tao et al., A Self-adaptive Deep Learning Algorithm for Intelligent Natural Gas Pipeline Control, Energy Reports, 3488-3496, 2021.

* cited by examiner

400

```
┌─────────────────────────────────────────────────────────┐
│ Determining an evaluation value of each candidate       │
│ handling scheme of a plurality of first candidate       │
│ handling schemes. When a count of iteration rounds is   │─ 410
│ equal to 1, the first candidate handling scheme may be  │
│ an initial candidate scheme among the plurality of      │
│ initial candidate schemes; or when the count of         │
│ iteration rounds is greater than 1, the first candidate │
│ handling scheme may be the third candidate handling     │
│ scheme of a previous round of iteration                 │
└─────────────────────────────────────────────────────────┘
                            │
                            ▼
┌─────────────────────────────────────────────────────────┐
│ Determining second candidate handling schemes from the  │─ 420
│ plurality of first candidate handling schemes based on  │
│ the evaluation values of the first candidate handling   │
│ schemes                                                 │
└─────────────────────────────────────────────────────────┘
                            │
                            ▼
┌─────────────────────────────────────────────────────────┐
│ Determining the third candidate handling schemes by     │─ 430
│ performing transform processing on the second candidate │
│ handling schemes                                        │
└─────────────────────────────────────────────────────────┘
                            │
                            ▼
┌─────────────────────────────────────────────────────────┐
│ Determining reference values of the third candidate     │─ 440
│ handling schemes                                        │
└─────────────────────────────────────────────────────────┘
                            │
                            ▼
┌─────────────────────────────────────────────────────────┐
│ Screening the third candidate handling schemes based on │
│ the reference values of the third candidate handling    │─ 450
│ schemes, and using the screened third candidate         │
│ handling schemes as the first candidate handling        │
│ schemes in the next round or to determine the           │
│ abnormality handling scheme                             │
└─────────────────────────────────────────────────────────┘
```

FIG. 4

METHODS AND INTERNET OF THINGS (IoT) SYSTEMS FOR PROCESSING ABNORMALITY OF SMART GAS PIPELINE NETWORK

CROSS-REFERENCE TO RELATED DISCLOSURES

This application claims priority to Chinese Patent Application No. 202211222298.1, filed on Oct. 8, 2022, and the entire contents of which are hereby incorporated by reference.

TECHNICAL FIELD

The present disclosure relates to the field of smart detection of gas pipelines, and in particular, to methods and Internet of Things (IoT) systems for processing abnormality of a smart gas pipeline network.

BACKGROUND

Gas safety has become a topic of great concern in society because gas safety is related to the safety of people's lives and property. At present, common gas safety hazards may include problems such as deformation, corrosion, rupture, gas leakage of gas pipelines, etc. Conventional maintenance methods may include manual inspection of key parts of gas pipelines, daily maintenance of gas pipeline network equipment, targeted maintenance after receiving emergency notices, etc. When the above manual maintenance methods are adopted, due to limited labor resources, a maintenance scope may not cover all gas pipelines in time, so that there may be safety hazards of missed inspection and untimely detection of safety hazards in gas pipeline maintenance.

Therefore, it is necessary to provide a method and an Internet of Things (IoT) system for processing abnormality of a smart gas pipeline network configured to timely discover potential safety hazards of gas pipelines, and notify relevant personnel to arrive at a designated area to eliminate potential safety hazards to ensure gas safety of users.

SUMMARY

One or more embodiments of the present disclosure provide a method for processing abnormality of a smart gas pipeline network implemented based on a smart gas safety management platform of a safety management Internet of Things (IoT) system for the smart gas pipeline network. The method may include: obtaining detection information of a gas pipeline in a target area; determining an abnormality pipeline in the target area based on the detection information; and determining an abnormality handling scheme based on the detection information corresponding to the abnormal pipeline. In some embodiments, the method may further include: transmitting the abnormal pipeline and/or the abnormality handling scheme to a smart gas user platform based on a smart gas service platform.

One or more embodiments of the present disclosure provide a safety management Internet of Things (IoT) system for a smart gas pipeline network including a smart gas safety management platform. The smart gas safety management platform may be configured to: obtain detection information of a gas pipeline in a target area; determine an abnormal pipeline in the target area based on the detection information; and determine an abnormality handling scheme based on the detection information corresponding to the abnormal pipeline. In some embodiments, the IoT system may further include a smart gas user platform, a smart gas service platform, a smart gas pipeline network equipment sensor network platform, and a smart gas pipeline network equipment object platform. The smart gas pipeline network equipment object platform may be used to obtain the detection information of the gas pipeline in the target area. The smart gas pipeline network equipment sensor network platform may be used to transmit the detection information of the gas pipeline in the target area to the smart gas safety management platform. The smart gas service platform may be used to transmit the abnormal pipeline and/or the abnormality handling scheme to the smart gas user platform.

One or more embodiments of the present disclosure provide a non-transitory computer-readable storage medium storing computer instructions. When reading the computer instructions in the storage medium, a computer may implement the method for processing abnormality of the smart gas pipeline network.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein:

FIG. 4 is a flowchart illustrating at least one round of iteration in a plurality of rounds of iteration updating according to some embodiments of the present disclosure;

DETAILED DESCRIPTION

Figure 1:
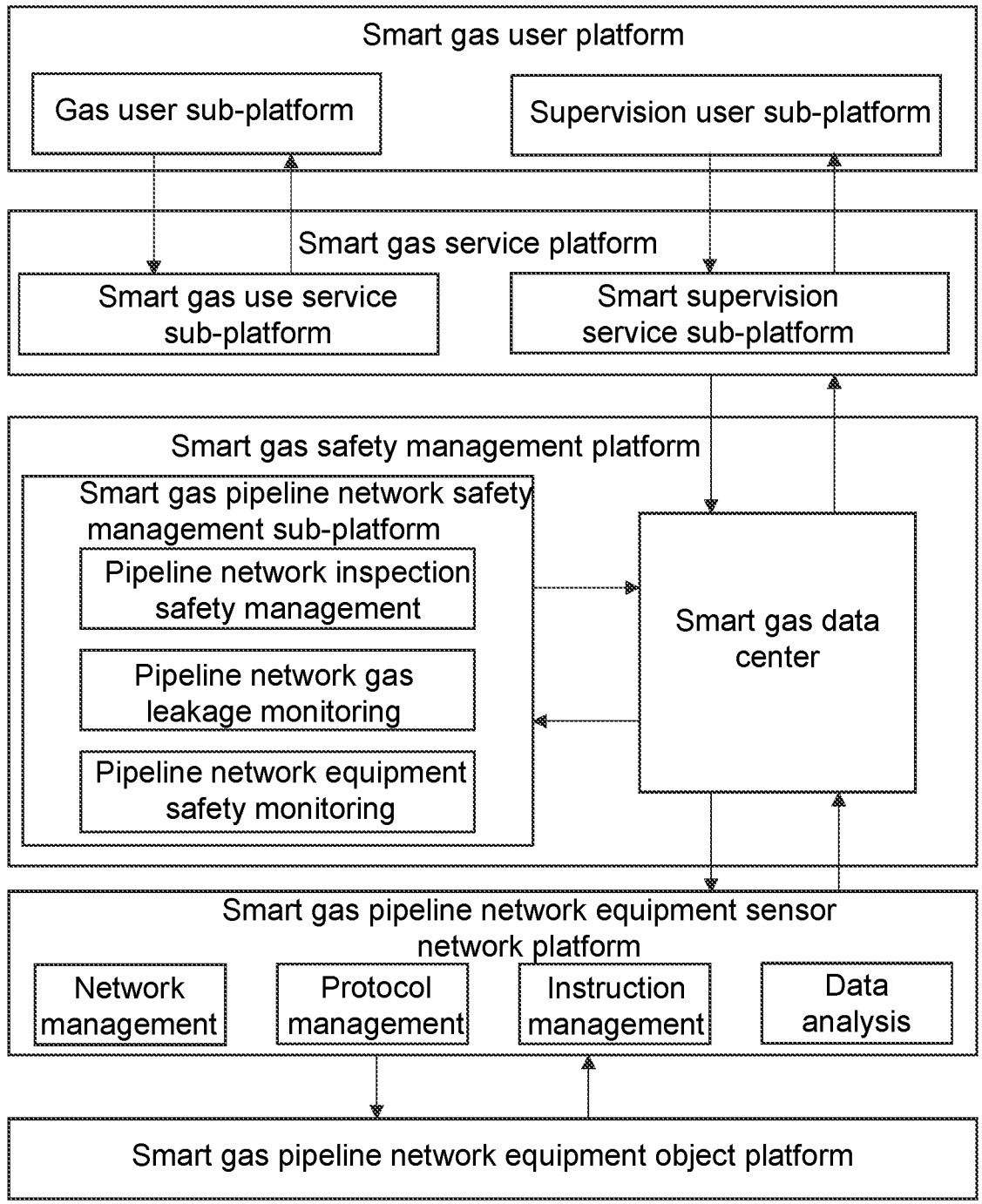
FIG. 1 is a diagram of a safety management Internet of Things system for a smart gas pipeline network according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a diagram of the safety management Internet of Things (IoT) system for the smart gas pipeline network according to some embodiments of this disclosure.

As shown in FIG. 1, the Internet of Things system 100 may include a smart gas user platform, a smart gas service platform, a smart gas safety management platform, a smart gas pipeline network equipment sensor network platform, and a smart gas pipeline network equipment object platform that interact in turn. The smart gas user platform, the smart gas service platform, the smart gas safety management platform, the smart gas pipeline network equipment sensor network platform, and the smart gas pipeline network equipment object platform may interact through communication connections in turn.

The smart gas user platform configured as a terminal device may be used to receive abnormal pipeline information and/or an abnormality handling scheme transmitted by the smart gas service platform, and may also be used to transmit an abnormal information query instruction of the gas pipeline network to the smart gas service platform. The terminal device may include an intelligent electronic device that implements data processing and data communication such as a desktop computer, a tablet computer, a laptop computer, a mobile phone, etc., which are not limited herein. In some embodiments, the smart gas user platform may include a gas user sub-platform and a supervision user sub-platform, so that both a gas user and a supervision user may receive the abnormal pipeline information and/or the abnormality handling scheme information transmitted by the smart gas service platform.

In some embodiments, the gas user sub-platform may be used to receive information related to safe gas use transmitted by a smart gas use service sub-platform, such as household gas use safety reminders, etc., and may also be used to transmit a gas use query instruction or abnormal information of the gas pipeline network to the smart gas use service sub-platform for abnormality warranty, etc. In some embodiments, the supervision user sub-platform may be used to receive the abnormal pipeline information and/or the abnormality handling scheme or gas safety operation information in a jurisdiction transmitted by the smart supervision service sub-platform, and may also be used to transmit the abnormal information query instruction of the gas pipeline network to the smart supervision service sub-platform.

The smart gas service platform is configured to receive the abnormal pipeline information and/or the abnormality handling scheme transmitted by a smart gas data center in the smart gas safety management platform, and transmit the abnormal pipeline information and/or the abnormality handling scheme to the smart gas user platform. The smart gas service platform is further configured to receive the abnormal information query instruction of the gas pipeline network issued by the smart gas user platform, and transmit the abnormal information query instruction of the gas pipeline network to the smart gas data center in the smart gas safety management platform. In some embodiments, the smart gas service platform may include the smart gas use service sub-platform and the smart supervision service sub-platform.

In some embodiments, the smart supervision service sub-platform may receive the abnormal pipeline information and/or the abnormality handling scheme transmitted by the smart gas safety management platform, and transmit the abnormal pipeline information and/or the abnormality handling scheme to the supervision user sub-platform. The smart supervision service sub-platform may be further configured to receive the abnormal information query instruction of the gas pipeline network issued by the supervision user sub-platform, and transmit the abnormal information query instruction of the gas pipeline network to the smart gas data center in the smart gas safety management platform.

The smart gas safety management platform may be configured to receive detection information of a gas pipeline in a target area transmitted by the smart gas pipeline network equipment sensor network platform, determine an abnormal pipeline in the target area based on the detection information, and may determine the abnormality handling scheme based on the detection information corresponding to the abnormal pipeline. In some embodiments, the smart gas safety management platform may include the smart gas data center and the smart gas pipeline network safety management sub-platform. The smart gas pipeline network safety management sub-platform may include a functional module such as a pipeline network inspection safety management module, a pipeline network gas leakage monitoring module, a pipeline network equipment safety monitoring module, etc., which may be used to manage inspection safety, monitor pipeline network gas leakage, and monitor pipeline network equipment safety, etc.

In some embodiments, the smart gas data center may receive the detection information of the gas pipeline in the target area transmitted by the smart gas pipeline network equipment sensor network platform. The smart gas pipeline network safety management sub-platform may determine the abnormal pipeline and the abnormality handling scheme based on the detection information of the gas pipeline in the target area obtained by the smart gas data center, and transmit the abnormal pipeline and the abnormality handling scheme to the smart supervision service sub-platform and the gas user sub-platform of the smart gas service platform based on the smart gas data center. The smart gas data center may also receive the abnormal information query instruction of the gas pipeline network transmitted by the smart supervision service sub-platform, and transmit the abnormal information query instruction of the gas pipeline network to the smart gas pipeline network equipment sensor network platform.

The smart gas pipeline network equipment sensor network platform configured as a communication network and a gateway may be used to receive the detection information of the gas pipeline in the target area obtained by the smart gas pipeline network equipment object platform, and transmit the detection information to the smart gas safety management platform. The smart gas pipeline network equipment sensor network platform may also receive the abnormal information query instruction of the gas pipeline network transmitted by the smart gas pipeline network safety management platform, and transmit the abnormal information query instruction of the gas pipeline network to the smart gas pipeline network equipment object platform.

In some embodiments, the smart gas pipeline network equipment sensor network platform may include a module such as a network management module, a protocol management module, an instruction management module, a data analysis module, etc. The network management module and the protocol management module may correspond to a network communication function and a communication protocol conversion function of the smart gas pipeline network equipment sensor network platform respectively to realize the interaction between the smart gas pipeline network equipment sensor network platform and the smart gas pipeline network equipment object platform and the smart gas safety management platform. The instruction management module and the data analysis module in the smart gas pipeline network equipment sensor network platform may analyze, classify, and transform the abnormal information query instruction of the gas pipeline network and the detection information of the gas pipeline in the target area, so as to complete transmission of the abnormal information query instruction of the gas pipeline network and the detection information of the gas pipeline in the target area.

The smart gas pipeline network equipment object platform may be configured to obtain the detection information of the gas pipeline in the target area, and may be further configured to receive the abnormal information query instruction of the gas pipeline network transmitted by the smart gas pipeline network equipment sensor network platform. The pipeline network equipment may be a device included in the gas pipeline network system, including a pressure sensor, a flow meter, a temperature sensor, etc., which are respectively used to detect pressure, flow, temperature, etc. of each point in the gas pipeline network.

Based on the method for processing abnormality of the smart gas pipeline network, the detection information of the gas pipeline in the target area may be transmitted by the smart gas pipeline network equipment object platform and the smart gas pipeline network equipment sensor network platform in turn. The smart gas safety management platform may process the detection information of the gas pipeline in the target area to obtain the abnormal pipeline and/or the abnormality handling scheme. The abnormal pipeline and/or the abnormality handling scheme may be transmitted by operations of the smart gas safety management platform, the smart gas service platform, and the smart gas user platform in turn. The abnormal information query instruction of the gas pipeline network may be transmitted by operations of the smart gas user platform, the smart gas service platform, the smart gas safety management platform, the smart gas pipeline network equipment sensor network platform, and the smart gas pipeline network equipment object platform in turn. When the abnormal information query instruction of the gas pipeline network is transmitted, receiving and processing of the instruction by each platform may be specifically processed into a set data packet format that is easy to be identified by a next-level receiving object.

It should be understood that the IoT system and the modules shown in FIG. 1 may be implemented in various ways.

It should be noted that the above descriptions of the safety management IoT system for the smart gas pipeline network and the modules thereof is merely for convenience of descriptions, and may not limit the disclosure to the scope of the embodiments. It may be understood that for those skilled in the art, after understanding the principle of the IoT system, it is possible to combine the modules arbitrarily, to form a sub-system to connect with other modules without departing from the principle. In some embodiments, the smart gas user platform, the smart gas service platform, the smart gas safety management platform, the smart gas pipeline network equipment sensor network platform, and the smart gas pipeline network equipment object platform disclosed in FIG. 1 may be different modules in a system, and may also be a module to implement the functions of the above two or more modules. For example, each module may share a storage module, or each module may also have its own storage module. All such variations are within the protection scope of the present disclosure.

Figure 2:
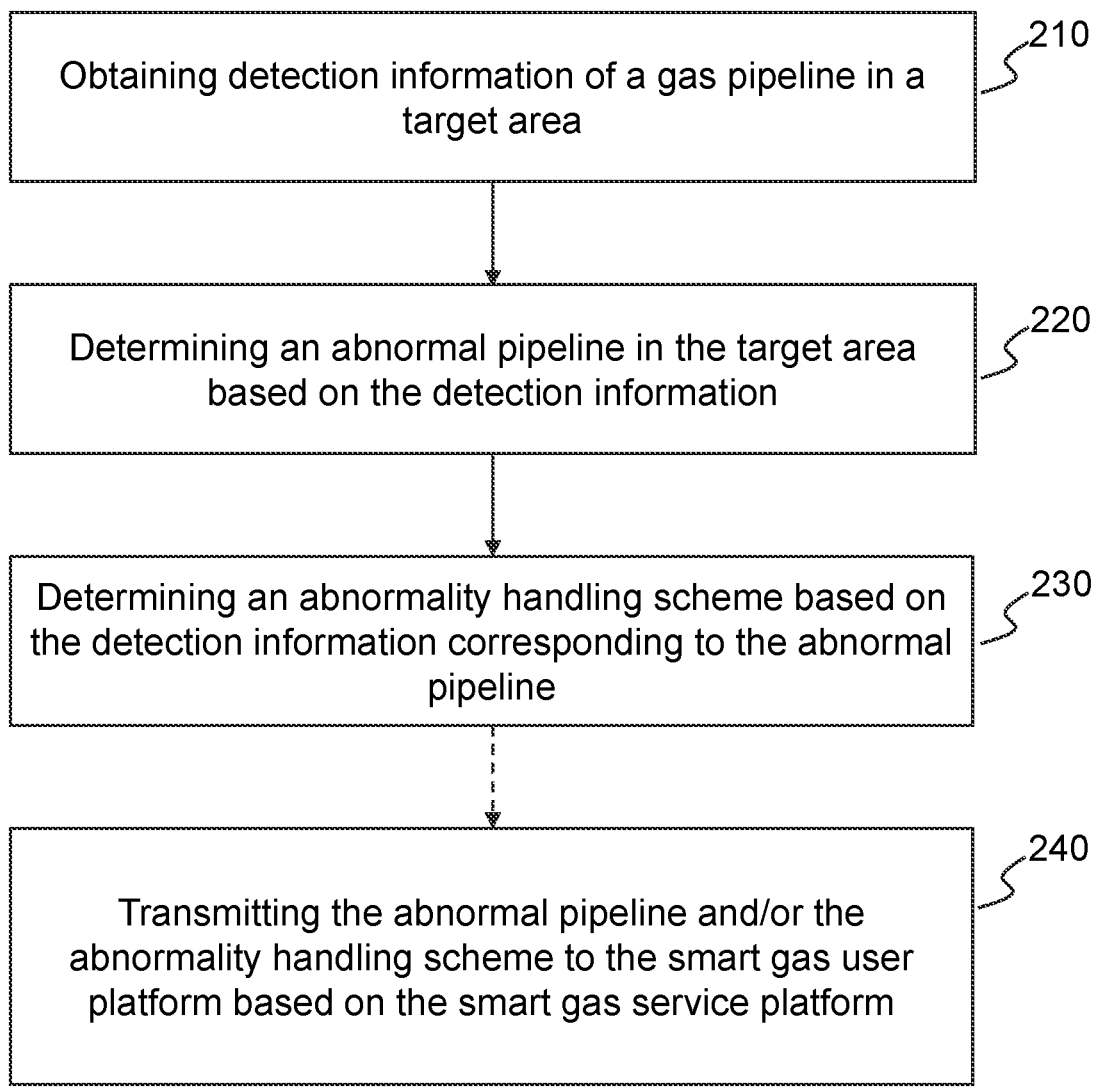
FIG. 2 is a flowchart illustrating an exemplary method for processing abnormality of a smart gas pipeline network according to some embodiments of the present disclosure.

FIG. 2 is a flowchart illustrating an exemplary process for processing abnormality of a smart gas pipeline network according to some embodiments of the present disclosure. In some embodiments, the process 200 may be executed by the Internet of Things system 100. As shown in FIG. 2, the process 200 may include the following operations.

In 210, obtaining detection information of a gas pipeline in a target area.

The target area refers to an area where gas pipeline detection is required, such as a certain street, a certain residential area, etc. The target area may be determined manually or pre-defined. For example, if a gas user reports that gas usage in a certain area is abnormal, or a supervision user finds that gas usage data in the certain area is abnormal, the area may be manually designated as the target area. As another example, if it is pre-defined that the gas pipeline in the certain area needs to be inspected regularly for three months, when it is the time for inspection in the certain area, the area is determined as the target area.

The detection information is relevant information obtained when the gas pipeline is detected, such as pressure, flow, temperature, etc. of each point in the gas pipeline segment. The point refers to a position where a corresponding detection device (e.g., a sensor, etc.) is installed in the gas pipeline to obtain the detection information. A plurality of points may be set in a same gas pipeline.

In some embodiments, the smart gas data center in the smart gas safety management platform may obtain the detection information of the gas pipeline in the target area based on the smart gas pipeline network equipment object platform. The smart gas pipeline network equipment object platform may be configured as a detection device of the pipeline network equipment to obtain the detection information of the gas pipeline in the target area. For example, the smart gas pipeline network equipment object platform may use a pressure sensor, a flow meter, and a temperature sensor to obtain the pressure, the flow, and the temperature of each point in the gas pipeline segment.

In some embodiments, the supervision user may call latest detection information of the gas pipeline in the target area stored in the Internet of Things system as the detection information of the gas pipeline in the target area. For example, if the supervision user finds that the gas usage in the certain area is abnormal, the supervision user may preferentially call the latest detection information of the gas pipeline in the target area stored in the Internet of Things system, so as to quickly analyze the detection information of the gas pipeline.

In 220, determining an abnormal pipeline in the target area based on the detection information.

The abnormal pipeline is a gas pipeline that may have a usage abnormality. For example, a gas flow rate abnormality in the gas pipeline, a pressure abnormality in the gas pipeline, a temperature abnormality in the gas pipeline, etc.

In some embodiments, the smart gas data center may transmit the detection information to the smart gas safety management sub-platform. The smart gas safety management sub-platform may determine the abnormal pipeline in the target area based on the detection information in various ways. For example, the smart gas safety management sub-platform may determine whether the gas pipeline is the abnormal pipeline by comparing the detection information of the gas pipeline in the target area with reference detection information. The reference detection information may be relevant information of the gas pipeline under a normal working condition, for example, the reference detection information may be a gas delivery speed, temperature, etc. of the gas pipeline under the normal working condition. If the detection information of the gas pipeline in the target area does not meet the reference detection information, the gas pipeline may be determined to be the abnormal pipeline. For example, the reference detection information may include that the gas flow rate in a low-pressure gas pipeline is less than or equal to 3 m/s. If the gas flow rate in the low-pressure gas pipeline of a gas pipeline A is 5 m/s in the detection information of the gas pipeline in the target area, the detection information may not meet the reference detection information, so the gas pipeline A in the target area may be the abnormal pipeline.

In 230, determining an abnormality handling scheme based on the detection information corresponding to the abnormal pipeline.

The abnormality handling scheme may be a scheme used to resolve an abnormality that occurs in the abnormal pipeline. For example, if the detection information corresponding to the abnormal pipeline is that the gas flow rate in the abnormal pipeline is lower than a normal value, the abnormality handling scheme may be to increase the gas flow rate. As another example, if the detection information corresponding to the abnormal pipeline is that the pressure in the abnormal pipeline is too high, the abnormal pipeline may be depressurized, etc.

In some embodiments, the abnormality handling scheme may include a scheme for handling a plurality of abnormal conditions. For example, the abnormality handling scheme may include a handling scheme for a gas flow rate abnormality, a handling scheme for a pressure abnormality, and a handling scheme for a temperature abnormality, and English letters A, B, and C may respectively represent types of the handling schemes. For example, increasing the gas flow rate by 1 m/s may be expressed as A+1, increasing the pressure by 5 Pa may be expressed as B+5, decreasing the temperature by 1° C. may be expressed as C−1, and the abnormality handling scheme may be expressed as (A+1, B+5, C−1). Other abnormal conditions and handling schemes for the abnormal conditions may be expressed in the above manner.

In some embodiments, the abnormality handling scheme may be determined by manual analysis. For example, if in the detection information of the gas pipeline in the target area, the gas flow rate in the low-pressure gas pipeline is 5 m/s, which exceeds a normal value of 3 m/s, a gas company may analyze the detection information and then provide the abnormality handling scheme to reduce the gas flow rate. The specific adjustment value may be set based on experience, such as gradual reduction, etc.

In some embodiments, the detection information of the gas pipeline in the target area may be obtained based on the smart gas data center. The smart gas data center may transmit the detection information of the gas pipeline in the target area to the smart gas pipeline network safety management sub-platform. The smart gas pipeline network safety management sub-platform may determine the abnormality handling scheme. The smart gas pipeline network safety management sub-platform may preset abnormality handling schemes corresponding to a plurality of abnormal conditions. For example, a corresponding gas flow rate adjustment scheme when the preset gas flow rate value exceeds a preset range, different cooling schemes corresponding to different high temperature ranges when the preset gas temperature value is higher than a corresponding range, etc. The smart gas pipeline network safety management sub-platform may determine a corresponding abnormal condition according to the detection information of the gas pipeline in the target area, and then match a corresponding abnormality handling scheme for the abnormal condition.

In some embodiments, the abnormality handling scheme may also be determined based on a preset algorithm. For more descriptions about the preset algorithm, please see FIG. 3, 4 and related descriptions.

In 240, transmitting the abnormal pipeline and/or the abnormality handling scheme to the smart gas user platform based on the smart gas service platform.

In some embodiments, after determining the abnormal pipeline and/or the abnormality handling scheme, the smart gas pipeline network safety management sub-platform may transmit the abnormal pipeline information and/or the abnormality handling scheme to the smart gas service platform through the smart gas data center. The smart gas service platform may transmit the abnormal pipeline information and/or the abnormality handling scheme to the supervision user sub-platform of the smart gas user platform. The supervision user may obtain the abnormal pipeline information and/or the abnormality handling scheme on the smart gas user platform.

The determination and transmission of the abnormal pipeline and/or the abnormality handling scheme in the gas pipeline network may be implemented based on the safety management Internet of Things system for the smart gas pipeline network, which may be convenient for the supervision user to obtain the abnormality handling scheme in time to quickly repair the abnormal pipeline, more accurately and conveniently supervise the gas pipeline and dynamically check the abnormality of the gas pipeline to ensure the gas safety of users.

Figure 3:
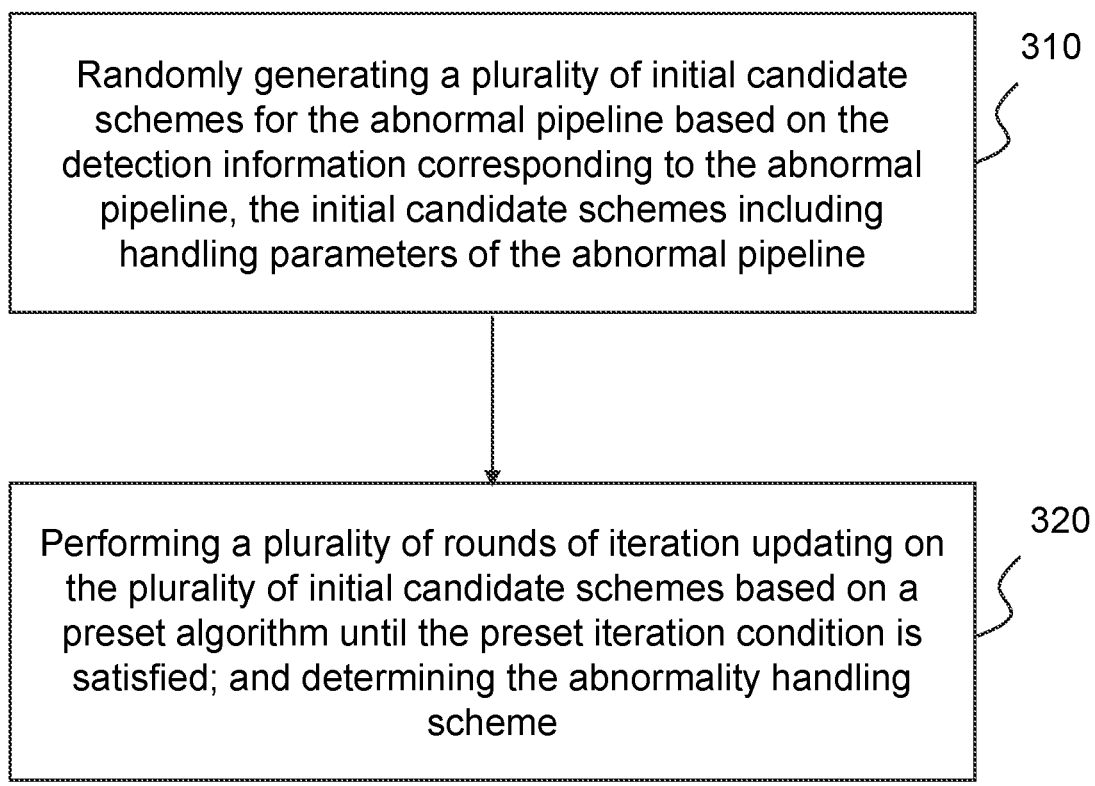
FIG. 3 is a flowchart illustrating an exemplary process for determining an abnormality handling scheme according to some embodiments of the present disclosure.

FIG. 3 is a flowchart illustrating an exemplary process for determining an abnormality handling scheme according to some embodiments of the present disclosure. In some embodiments, the process 300 may be executed by a smart gas safety management platform. As shown in FIG. 3, the process 300 may include the following operations.

In 310, randomly generating a plurality of initial candidate schemes for the abnormal pipeline based on the detection information corresponding to the abnormal pipeline, the initial candidate schemes including handling parameters of the abnormal pipeline.

The initial candidate schemes are handling schemes randomly generated for the detection information corresponding to the abnormal pipeline. For example, if the detection information corresponding to the abnormal pipeline is that the gas flow rate is lower than the normal value, the initial candidate schemes may include increasing the gas flow rate by 0.5 m/s or 1 m/s, etc. Referring to the handling scheme for the gas flow rate abnormality being expressed by A, the initial candidate schemes may be expressed by vectors as (A+0.5), (A+1), etc. As another example, if the detection information corresponding to the abnormal pipeline is that the gas flow rate is lower than the normal value and the pipeline pressure is lower than a normal value, the initial candidate schemes may include increasing the gas flow rate and increasing the pipeline pressure. Referring to the handling scheme for the pressure abnormality being expressed by B, similar to the above generation method of the initial candidate schemes, the initial candidate schemes may be expressed by vectors as (A+0.5, B+0.5), (A+1, B+0.5), etc.

The handling parameters refer to the handling schemes corresponding to the pipeline abnormality. For example, A+0.5 in the initial candidate schemes (A+0.5, B+0.5) may be the handling parameter. A+0.5 may mean that the gas flow rate is increased by 0.5 m/s for the gas flow rate abnormality in the pipeline abnormality. B+0.5 may also be the handling parameter. B+0.5 may mean that the pressure is increased by 0.5 Pa for the pipeline pressure abnormality in the pipeline abnormality.

In some embodiments, the smart gas safety management platform may randomly generate a plurality of initial candidate schemes for the abnormal pipeline based on the detection information corresponding to the abnormal pipeline. Upper and lower limits may be set for numerical values of the handling parameters in the randomly generated initial candidate schemes. For example, if the gas flow rate in the detection information is lower than the normal value, in the gas flow rate may be randomly increased by n m/s, where n is greater than 0 and less than or equal to 10.

In some implementation, a plurality of initial candidate schemes preset in the smart gas safety management platform may be called based on the detection information corresponding to the abnormal pipeline. For example, the plurality of corresponding initial candidate schemes may be stored in the smart gas safety management platform for various possible abnormal conditions in advance for calling.

In 320, performing a plurality of rounds of iteration updating on the plurality of initial candidate schemes based on a preset algorithm until the preset iteration condition is satisfied; and determining the abnormality handling scheme.

The preset algorithm refers to an algorithm that performs the plurality of rounds of iteration updating on the plurality of initial candidate schemes to determine the abnormality handling scheme. For detailed instructions, please see FIG. 4.

A process of performing the plurality of rounds of iteration updating on the plurality of initial candidate schemes may include determining a plurality of first candidate handling schemes based on the plurality of initial candidate schemes, determining second candidate handling schemes from the first candidate handling schemes through evaluation values of the first candidate handling schemes, determining third candidate handling schemes by performing transform processing on the second candidate handling schemes, determining the first candidate handling schemes in a next round using reference values of the third candidate handling schemes, and repeating the above-mentioned iteration updating process for the re-determined first candidate handling schemes. When the preset iteration condition is satisfied, the third candidate handling scheme may be determined as the abnormality handling scheme. For details of performing the plurality of rounds of iteration updating on the plurality of initial candidate schemes, please see FIG. 4 and related descriptions.

The preset iteration condition refers to a preset condition for stopping the plurality of rounds of iterations. In some embodiments, the preset iteration condition may include that a count of iteration rounds is greater than or equal to a preset round value, the evaluation value of the first candidate handling scheme is greater than or equal to a preset evaluation value, or a variation value of the evaluation value of the first candidate handling scheme is smaller than a preset variation value in at least two consecutive rounds of iterations. For more descriptions about the preset iteration condition, please see FIG. 4 and related descriptions.

The abnormality handling scheme may be determined based on the preset algorithm. The process of the plurality of rounds of iteration updating of the initial candidate scheme may make the determined abnormality handling scheme an optimal solution, shorten the time for determining the abnormality handling scheme and save labor costs while providing an accurate abnormality handling scheme, thereby improving the handling efficiency of the abnormal pipeline in the gas pipeline network.

It should be noted that the above description about the process 300 is merely for example and illustration, and not intended to limit the scope of the present disclosure. For those skilled in the art, various modifications and changes may be made to the process 300 under the guidance of the present disclosure. However, these modifications and changes are still within the scope of the present disclosure.

FIG. 4 is a flowchart illustrating at least one round of iteration in a plurality of rounds of iteration updating according to some embodiments of the present disclosure. In some embodiments, the process 400 may be executed by a smart gas safety management platform. As shown in FIG. 4, the process 400 may include the following operations.

In 410, determining an evaluation value of each candidate handling scheme of a plurality of first candidate handling schemes. When a count of iteration rounds is equal to 1, the first candidate handling scheme may be an initial candidate scheme among the plurality of initial candidate schemes; or when the count of iteration rounds is greater than 1, the first candidate handling scheme may be the third candidate handling scheme of a previous round of iteration.

The first candidate handling scheme may refer to a candidate handling scheme that needs to be iterated. For example, in a first round of iteration, the first candidate handling scheme may be one of an initial candidate handling scheme 1, an initial candidate handling scheme 2 . . . , and an initial candidate handling scheme n.

In some embodiments, the first candidate handling scheme may be represented by a vector. For example, the first candidate handling scheme may include a candidate handling scheme for a gas flow rate abnormality, a candidate handling scheme for a pressure abnormality, and a candidate handling scheme for a temperature abnormality, and English letters A, B, and C may be used to represent types of the handling schemes respectively. For example, increasing the gas flow rate by 1 m/s may be expressed as A+1, increasing the pressure by 5 Pa may be expressed as B+5, and decreasing the temperature by 1° C. may be expressed as C−1, then the first candidate handling scheme may be expressed as (A+1, B+5, C−1).

The first candidate handling scheme may be determined based on an iteration result of the previous round, or based on the initial candidate handling scheme. For example, in the first round of iteration, the first candidate handling schemes may be the initial candidate handling schemes. In subsequent iterations, the first candidate handling schemes may be determined based on the third candidate handling schemes of the previous round of iteration. Detailed instructions about the third candidate handling schemes is provided as follows.

The evaluation value may refer to a relevant parameter used to evaluate effects of the candidate handling schemes. The evaluation value may be positively correlated with the effects of a candidate handling scheme. That is, the better the effect of the candidate handling schemes in handling abnormalities, the greater the evaluation value.

In some embodiments, the evaluation value may be determined in various ways. For example, the evaluation value may be determined by manual calculation, or by an algorithm model, etc.

In some embodiments, the smart gas safety management platform may determine fitness (also referred to as fitness value) of the first candidate handling scheme based on processing on attribute information of the abnormal pipeline and the first candidate handling scheme performed by a fitness determination model, and determine the evaluation value of the first candidate handling scheme based on the fitness of the first candidate handling scheme.

The fitness determination model may be used to determine the fitness of the first candidate handling scheme. In some embodiments, the fitness model may be a machine learning model.

In some embodiments, the fitness determination model may process the attribute information of the abnormal pipeline and the first candidate handling scheme to determine the fitness of the first candidate handling scheme. An input of the fitness determination model may include the attribute information of the abnormal pipeline and the first candidate handling scheme. An output of the fitness determination model may include the fitness of the first candidate handling scheme.

The attribute information of the abnormal pipeline may be relevant information of a pipeline where an abnormality exists. For example, a position and a length of the abnormal pipeline, and a specific abnormality detection situation of each abnormal pipeline. The specific abnormality detection situation may include information such as the detection pressure, the detection temperature, etc. in the pipeline segment.

In some embodiments, the fitness may be similar to the evaluation value and may also be used to evaluate the effects of the candidate handling schemes. The greater the fitness value, the better the candidate handling scheme may handle the abnormality, and the higher the success rate of solving the abnormality.

In some embodiments, the smart gas safety management platform may directly use the fitness value of the first candidate handling scheme as the evaluation value of the first candidate handling scheme or use a value obtained by proportionally scaling the fitness value of the first candidate handling scheme as the evaluation value of the first candidate handling scheme.

In some embodiments, the smart gas safety management platform may determine the evaluation value of the first candidate handling scheme based on the fitness of the first candidate handling scheme and an interaction impact prediction model. For more descriptions about the interaction impact prediction model, please see FIG. 5 and related descriptions thereof.

In some embodiments of the present disclosure, determining the fitness of the first candidate handling scheme using the fitness determination model and determining the evaluation value of the first candidate handling scheme based on the fitness can not only improve the operation efficiency, but also ensure the accuracy of the result.

In 420, determining second candidate handling schemes from the plurality of first candidate handling schemes based on the evaluation values of the first candidate handling schemes.

The second candidate handling schemes may refer to candidate handling schemes screened based on the evaluation values of the first candidate handling schemes.

In some embodiments, the smart gas safety management platform may determine a plurality of second candidate handling schemes from the plurality of first candidate handling schemes based on the evaluation value corresponding to each of the plurality of first candidate handling schemes. For example, the first candidate handling schemes with the evaluation values greater than a preset evaluation value may be determined as the second candidate handling schemes. The preset evaluation value may be a parameter set in advance. Merely by way of example, a first candidate handling scheme 1 (A+1, B+5, C−1) whose evaluation value is greater than the preset evaluation value may be selected from three first candidate handling schemes of the first candidate handling scheme 1 (A+1, B+5, C−1), a first candidate handling scheme 2 (A+1, B+4, C−0.5), and a first candidate handling scheme 3 (A+0.5, B+4, C−1) as the second candidate handling scheme.

In 430, determining the third candidate handling schemes by performing transform processing on the second candidate handling schemes.

The third candidate handling schemes may refer to candidate handling schemes obtained when the second candidate handling schemes are further processed.

In some embodiments, the third candidate handling schemes may be determined by transform processing of the second candidate handling schemes. The transform processing may include a first transform and a second transform.

In some embodiments, the first transform may include: selecting two second candidate handling schemes from the plurality of second candidate handling schemes, generating at least two third alternative schemes by exchanging one or more handling parameters in the selected two candidate handling schemes, and determining the third candidate handling schemes based on the third alternative schemes.

In some embodiments, the first transform may be to exchange the handling parameters of a same abnormal pipeline or a same abnormal area in the plurality of different second candidate handling schemes.

For example, a second candidate handling scheme 1 and a second candidate handling scheme 2 may be both handling schemes for the abnormality in an area A. The second candidate handling scheme 1 may be (A+1, B+5, C−1), and the second candidate handling scheme may be (A+1, B+4, C−0.5). The second handling parameters in the second candidate handling scheme 1 and the second candidate handling scheme 2 may be exchanged to generate the third alternative schemes. For example, a third alternative scheme 1 may be (A+1, B+4, C−1). A third alternative scheme 2 may be (A+1, B+5, C−0.5).

In some embodiments, the smart gas safety management platform may also preferentially exchange the handling parameters with poor effects in the two second candidate handling schemes, so as to improve the efficiency of determining the abnormality handling scheme. The handling parameters with poor effects in the scheme may be obtained based on experiments. For example, when adjusting a certain type of handling parameters, the handling effect of the entire scheme may be greatly improved, and the handling parameters may be considered as the handling parameters with poor effects.

The third alternative schemes may refer to candidate handling schemes obtained when the first transform processing is performed on the second candidate handling schemes. In some embodiments, the smart gas safety management platform may directly use the third alternative schemes as the third candidate handling schemes.

The second transform may refer to an operation for adjusting the handling parameters. In some embodiments, the second transform may include: generating the at least one third candidate handling scheme by updating at least one handling parameter in preliminary handling schemes.

The preliminary handling schemes may refer to the handling schemes to be subjected to the second transform. In some embodiments, the preliminary handling schemes may be the second candidate handling schemes or the third alternative schemes.

In some embodiments, for each of the plurality of preliminary handling schemes, the smart gas safety management platform may adjust at least one handling parameter in the preliminary handling scheme to generate the at least one third candidate handling scheme. For example, a preliminary handling scheme 1 may be (A+1, B+4, C−1), and the third handling parameter in the preliminary handling scheme 1 may be adjusted, that is, C−1 may be modified to C−0.8, then after the modification, the generated third candidate handling scheme may be (A+1, B+4, C−0.8).

In some embodiments, the smart gas safety management platform may also preferentially adjust the handling parameters with poor handling effect in the preliminary handling schemes, so as to improve the efficiency of determining the abnormality handling scheme.

It should be noted that the adjusted parameters cannot exceed a maximum value that the relevant equipment may bear. For example, a maximum temperature, a maximum pressure, etc. in the pipeline segment.

In some embodiments, the smart gas safety management platform may use the third candidate handling schemes obtained based on the preceding steps as the first candidate handling schemes for a next round of iteration, and repeat the iteration operations until the preset iteration condition is met. In some embodiments, the smart gas safety management platform may further process the obtained third candidate handling schemes based on the following operations.

In 440, determining reference values of the third candidate handling schemes.

The reference value may refer to a probability that any one of the third candidate handling schemes is selected as the first candidate handling scheme for the next round of iteration or a probability that any one of the third candidate handling schemes is used as a final abnormality handling scheme.

In some embodiments, the reference value of a certain candidate handling scheme in the third candidate handling schemes may be a ratio of the fitness value of the scheme to a total fitness value of the third candidate handling schemes. For example, if a total count of the third candidate handling schemes is 2, a fitness value of a third candidate handling scheme 1 is 0.4, and a fitness value of a third candidate handling scheme 2 is 0.1, then the reference value of the third candidate handling scheme 1 may be 0.4/(0.4+0.1) =0.8, that is, the reference value of the third candidate handling scheme 1 may be 0.8.

In some embodiments, the smart gas safety management platform may obtain the fitness of the third candidate handling schemes based on a fitness determination model, and perform calculation through programs, algorithms, and other methods based on the fitness value thereof to determine the reference values of the third candidate handling schemes.

In 450, screening the third candidate handling schemes based on the reference values of the third candidate handling schemes, and using the screened third candidate handling schemes as the first candidate handling schemes in the next round or to determine the abnormality handling scheme.

In some embodiments, the smart gas safety management platform may determine, based on the reference values, the first candidate handling schemes to enter the next round from the plurality of third candidate handling schemes. For example, the reference values may be sorted from large to small, and top several third candidate handling schemes may be determined as the first candidate handling schemes to enter the next round.

In some embodiments, the smart gas safety management platform may use the third candidate handling schemes whose reference values are greater than a preset reference value as the first candidate handling schemes in the next round. For example, if the total count of the third candidate handling schemes is 4, the reference value of a third candidate handling scheme 1 is 0.8, the reference value of a third candidate handling scheme 2 is 0.6, the reference value of a third candidate handling scheme 3 is 0.5, the reference value of a third candidate handling scheme 4 is 0.9, and the preset reference value is 0.7. The third candidate handling scheme 1 and the third candidate handling scheme 4 may be used as the first candidate handling schemes for the next round since the reference values of the third candidate handling scheme 1 and the third candidate handling scheme 4 are both greater than the preset reference value. The preset reference value may be a probability parameter set in advance.

The smart gas safety management platform may use the screened third candidate handling schemes as the first candidate handling schemes for the next round, and repeat operations 410-450 to continue iteration updating until the preset iteration condition is met, and a third candidate scheme with a largest reference value in all iteration may be determined as the abnormality handling scheme.

In some embodiments, the preset iteration condition may include that the count of iteration rounds is greater than or equal to a preset round value. The preset round value may be directly determined based on past experience, or may be determined through experiments, etc. For example, a small value (e.g., 50) may be set first, and the preset round value may be gradually increased to a reasonable range based on the iteration result.

In some embodiments, the preset iteration condition may include that the evaluation value of the first candidate handling scheme is greater than or equal to a preset evaluation value. The preset evaluation value may be a minimum evaluation value corresponding to a time when the scheme determined based on experience may successfully solve the abnormality. When the evaluation values of the first candidate handling schemes are greater than or equal to the preset evaluation value, it may mean that the handling scheme capable of solving the abnormality is generated.

In some embodiments, the preset iteration condition may further include that a variation value of the evaluation value of the first candidate handling scheme is smaller than a preset variation value in at least two consecutive rounds of iterations. The preset variation value may be a minimum variation requirement that needs to be satisfied by the evaluation values of the first candidate handling scheme before and after the iteration. If the variation value of the evaluation value of the first candidate handling scheme in at least two consecutive rounds of iterations is smaller than the preset variation value, it may be considered that the candidate handling schemes before and after the iteration have little or no variation, and the iteration may be stopped at this time.

The preset iteration condition may be preset by a user. In some embodiments, the preset iteration condition may include at least one of the above conditions.

In some embodiments of the present disclosure, the fitness of the first candidate handling scheme may be determined using the fitness determination model, which can ensure the accuracy of the result and improve the operation efficiency. Based on the exchange processing or preferentially exchanging or adjusting the handling parameters with poor handling effect in the candidate handling scheme, and performing the plurality of iterations, the efficiency of the iteration can be effectively improved to quickly determine the abnormality handling scheme.

Figure 5:
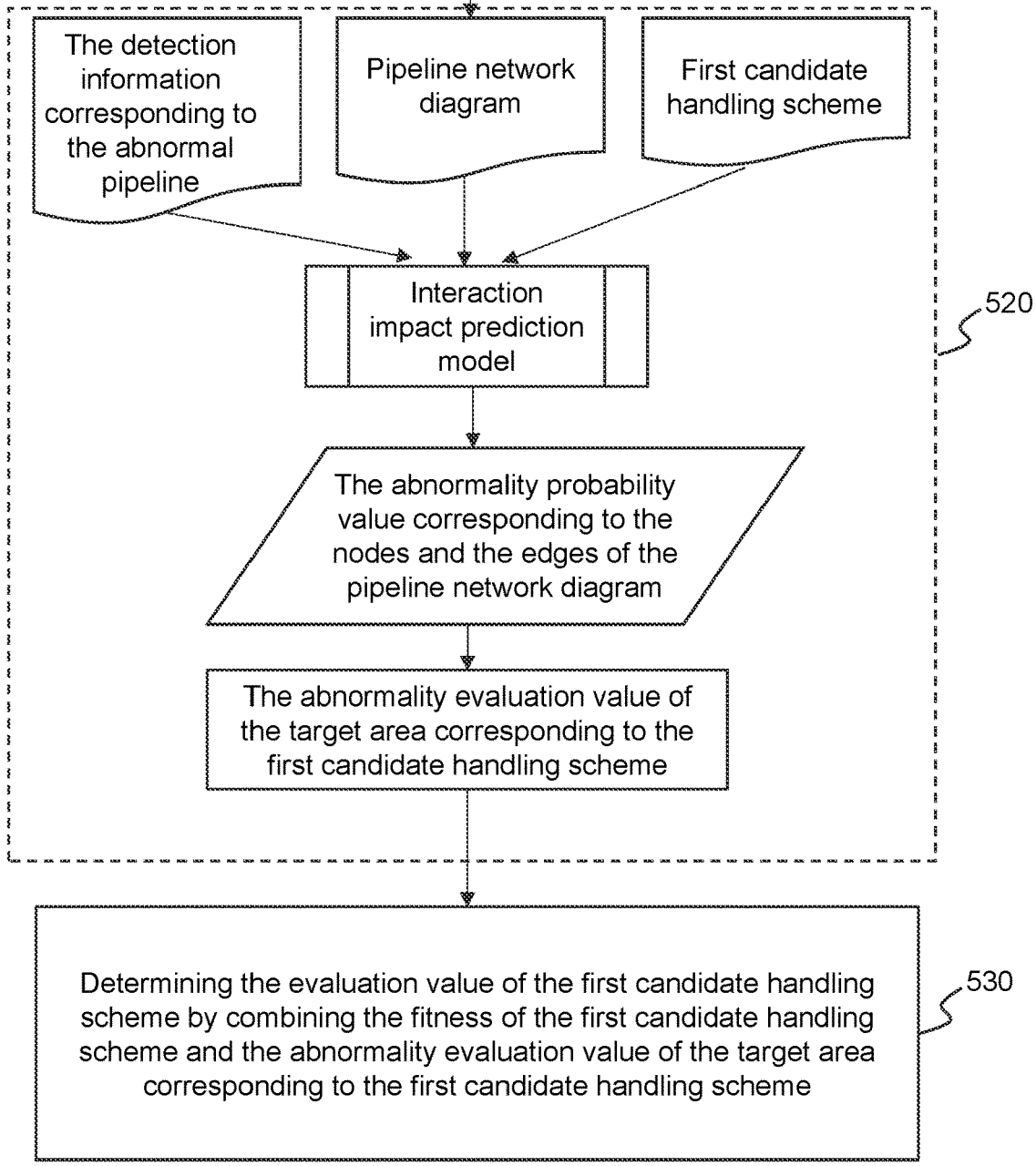
FIG. 5 is a flowchart illustrating an exemplary process for determining an evaluation value of a first candidate handling scheme according to some embodiments of the present disclosure.

FIG. 5 is a flowchart illustrating an exemplary process for determining an evaluation value of a first candidate handling scheme according to some embodiments of the present disclosure. In some embodiments, the process 500 may be executed by a smart gas safety management platform. As shown in FIG. 5, the process 500 may include the following operations.

In 510, constructing a pipeline network diagram of the target area based on pipeline network information of the target area, nodes of the pipeline network diagram corresponding to intersections or endpoints of the gas pipeline in the target area, and edges of the pipeline network diagram corresponding to the gas pipeline in the target area.

Figure 6:
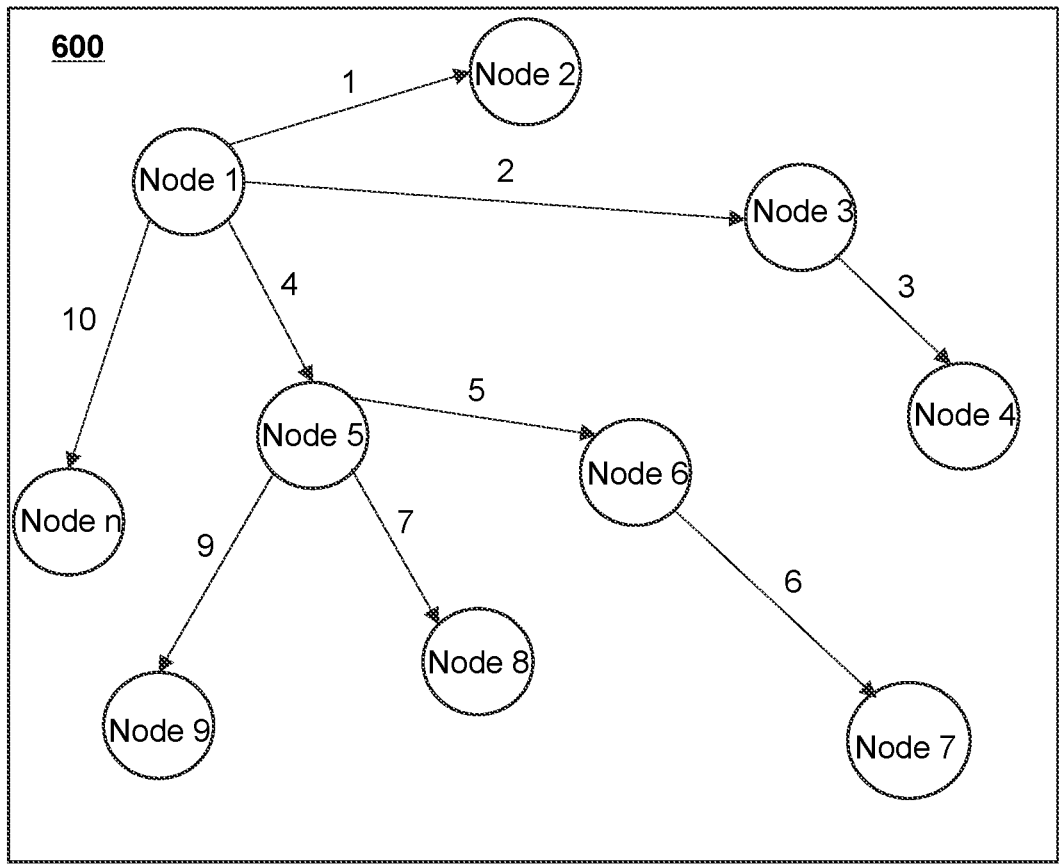
FIG. 6 is a schematic diagram illustrating a smart gas pipeline network diagram according to some embodiments of the present disclosure.

FIG. 6 is a schematic diagram illustrating a smart gas pipeline network diagram according to some embodiments of the present disclosure. As shown in FIG. 6, the pipeline network diagram 600 may be composed of a plurality of nodes and a plurality of edges.

The pipeline network diagram may refer to a diagram reflecting connection relationship between various gas pipeline segments.

The nodes of the pipeline network diagram may refer to nodes generated at intersections of the gas pipeline segments. A type of the node may include a splice node, a gas storage node, a gas use node, etc. The splice node may refer to a node generated by the splice points of the two pipelines. The gas storage node may refer to a node generated by the gas storage points (e.g., a gate station, etc.). The gas use node may refer to a node with a gas use point (e.g., a residential building, etc.).

As shown in FIG. 6, the splice node may include a "node 3," a "node 5," and a "node 6." The gas storage node may include a "node 1." The gas use node may include a plurality of nodes such as a "node 2," a "node 4," etc.

Different types of nodes may include different nodes features. For example, the node features of the splice node may include a pressure loss of a splice bend, etc. The node features of the gas storage node may include a standard flow, an inlet pressure, an outlet pressure, etc. The node features of the gas use node may include a gas consumption demand, etc.

The pressure loss may refer to an energy loss caused by overcoming flow resistance. The flow resistance may be increased due to appearance of eddies and redistribution of velocities in an area of sharp changes in the boundary when the gas flows through the bend. In some embodiments, the pressure loss of the splice bend may be determined by an equation for calculating the local pressure loss of the gas in the pipeline, or by calculating a difference between pressure at both ends of the bend. The pressure at both ends of the bend may be respectively obtained by a pressure tester installed at the both ends of the splice bend.

The standard flow may refer to gas flow in and out of the gas point under a standard condition (standard temperature and standard pressure). In some embodiments, the standard flow may be determined directly based on a configuration of the gas point.

The inlet pressure and the outlet pressure may refer to gas pressure at an inlet end and an outlet end of a gas point regulator respectively. In some embodiments, the inlet pressure and the outlet pressure may be obtained based on a monitoring device arranged in the regulator. The monitoring device may be used to monitor the pressure in gas pipeline in real time.

The gas consumption demand may refer to a total demand for gas of all dwellings in a residential building or an average demand for gas of each household in the building. In some embodiments, the gas consumption demand may be determined by calculating a weekly average gas consumption, a monthly average gas consumption, or the like.

The plurality of nodes may be connected by edges. The edges may refer to the gas pipeline segments, that is, there is the edge between two nodes directly connected by the gas pipeline.

In some embodiments, the edges of the pipeline network diagram may be directed edges used to represent a transmission direction of the gas. As shown in FIG. 6, the edge between the "node 1" and the "node 2" is from the "node 1" to the "node 2", which means that in this figure, the gas is transported from the "node 1" to the "node 2", that is, the gas is transported from the gas storage point to the residential building.

An edge feature of the pipeline network diagram may include a feature such as a length of a pipeline segment, pressure in a pipeline segment, temperature in the pipeline segment, etc. Different edges may have different features, that is, different pipeline segments may have different features. In some embodiments, the edges of the pipeline network diagram may have labels ("edge 1", "edge 2", etc. in FIG. 6) to distinguish different pipeline segments.

In some embodiments, the edges of the pipeline network diagram may have weights (not shown in the figure) to represent importance of the edges between two nodes. For example, the weight of "edge 4" may be 0.4, and the weight of "edge 1" may be 0.1, which may mean that "edge 4" is more important than "edge 1".

It may be understood that the diagram in FIG. 6 is only used to simply illustrate a connection network of gas pipeline segments, and an actual gas pipeline network may be more complex and may include more nodes and more edges.

In 520, determining an abnormality evaluation value of the target area corresponding to the first candidate handling scheme based on the processing of the pipeline network diagram, the detection information corresponding to the abnormal pipeline, and the first candidate handling scheme performed by an interaction impact prediction model, the abnormality evaluation value being determined based on an abnormality probability value outputted by and corresponding to the node and edges of the pipeline network diagram, the interaction impact prediction model being a machine learning model.

The interaction impact prediction model may be used to predict the abnormality evaluation value of the target area corresponding to the first candidate handling scheme. In some embodiments, the interaction impact prediction model may be a machine learning model, such as a convolutional neural network model, a graph neural network model, or the like.

In some embodiments, the interaction impact prediction model may be the graph neural network model.

In some embodiments, the smart gas safety management platform may input the pipeline network diagram, the detection information corresponding to the abnormal pipeline, and the first candidate handling scheme into the interaction impact prediction model. The interaction impact prediction model may perform processing based on the detection information corresponding to the abnormal pipeline corresponding to the nodes and the edges of the pipeline network diagram and the first candidate handling scheme and determine the 53.

The input of the interaction impact prediction model may be the pipeline network diagram, the detection information (e.g., the pressure is higher than the preset value, etc.) corresponding to the abnormal pipeline and the first candidate handling scheme (e.g., reducing the pressure, etc.), and the output of the interaction impact prediction model may be the abnormality probability value corresponding to the nodes and the edges of the pipeline network diagram.

In some embodiments, the interaction impact prediction model may be trained based on a plurality of sets of labeled training samples. Specifically, the labeled training samples may be inputted into the interaction impact prediction model, and the parameters of the interaction impact prediction model may be updated through training.

In some embodiments, the training samples may include a sample pipeline network diagram, detection information corresponding to a sample historical abnormal pipeline, and a sample handling scheme.

In some embodiments, the labels may be the abnormality probability values corresponding to the nodes and the edges of the pipeline network diagram. In some embodiments, away of obtaining the labels may be obtained according to an actual implementation of the sample handling scheme. For example, implementing the sample handling scheme, obtaining the detection information corresponding to the pipelines and the nodes at all levels, and monitoring whether there is an abnormality. The labels may also be obtained in other ways, such as based on historical data, etc.

In some embodiments, the interaction impact prediction model may be trained by various ways based on the training samples to update the parameters of the interaction impact prediction model. For example, training may be based on gradient descent.

In some embodiments, the training may end when the trained interaction impact prediction model satisfies a preset condition. The preset condition may be that the result of a loss function converges or is smaller than a preset threshold, or the like.

The abnormality probability value may refer to a probability that the abnormal condition occurs in the splice nodes, the gas storage nodes, the gas use nodes corresponding to the nodes and the edges of the pipeline network diagram and the gas pipelines when the first candidate handling scheme of the input interaction impact prediction model is implemented. For example, if the abnormality probability value outputted by the "edge 2" is 0.8, it means that when the first candidate handling scheme is implemented, a probability of the abnormal gas pipeline corresponding to the "edge 2" may be 80%. In some embodiments, the nodes and the edges of the pipeline network diagram may output specific abnormal conditions while outputting the abnormality probability values. For example, if the output of the "edge 2" is (a, 0.8), it means that a probability of an abnormality of type a is 0.8. At the same time, according to a preset abnormality type comparison table, it may be known that the abnormality of the type a is the flow rate abnormality.

The abnormality evaluation value refers to an evaluation value that the nodes and edges of the entire pipeline network diagram corresponding to the target area are abnormal due to the implementation of the first candidate handling scheme inputted to the interaction impact prediction model. In some embodiments, the abnormality evaluation value may be obtained by statistics of the abnormality probability values outputted by the nodes and the edges of the pipeline network diagram. For example, if there are 10 nodes and edges in the pipeline network diagram, and the abnormality probability values outputted by all the nodes and the edges of the pipeline network diagram are all smaller than the preset value (e.g., 0.2) based on the processing on the pipeline network diagram, the detection information corresponding to the abnormal pipeline, and the first candidate handling scheme performed by the interaction impact prediction model, it may be considered that the abnormality evaluation value corresponding to the first candidate handling scheme is a full score, such as 100 points. If the abnormality probability values outputted by one or more edges or nodes are greater than the preset value, the abnormality evaluation value of the first candidate handling scheme may be correspondingly reduced. For example, if the abnormality probability value outputted by one edge or node is greater than the preset value, the abnormality evaluation value of the first candidate handling scheme may be 90 points, and so on. The abnormality evaluation value may also be expressed in other ways, such as grades, etc.

In 530, determining the evaluation value of the first candidate handling scheme by combining the fitness of the first candidate handling scheme and the abnormality evaluation value of the target area corresponding to the first candidate handling scheme.

In some embodiments, the smart gas safety management platform may not only directly determine the fitness of the first candidate handling scheme as the evaluation value, but also comprehensively consider the fitness of the first candidate handling scheme and the abnormality evaluation value of the target area corresponding to the first candidate handling scheme to determine the evaluation value of the first candidate handling scheme. For example, the fitness of the first candidate handling scheme and the abnormality evaluation value of the target area corresponding to the first candidate handling schemes may be given different weights, and the evaluation value of the first candidate handling schemes may be determined in the form of weighted summation, and may also be determined by other methods such as averaging.

In some embodiments of the present disclosure, the trained interaction impact prediction model may be used to predict the interaction impact generated by the processing of the first candidate handling schemes, the abnormality evaluation value of the target area corresponding to the first candidate handling scheme may be determined according to the prediction result, and the evaluation value may be determined based on the abnormality evaluation value and the fitness of the first candidate scheme, which may make the evaluation value more accurate.

Having thus described the basic concepts, it may be rather apparent to those skilled in the art after reading this detailed disclosure that the foregoing detailed disclosure is intended to be presented by way of example only and is not limiting.

Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for processing abnormality of a smart gas pipeline network implemented based on a smart gas safety management platform of a safety management Internet of Things (IoT) system for the smart gas pipeline network, the safety management IoT system for the smart gas pipeline network further including a smart gas user platform, a smart gas service platform, a smart gas pipeline network equipment sensor network platform, and a smart gas pipeline network equipment object platform, the smart gas user platform including a gas user sub-platform and a supervision user sub-platform, the smart gas service platform including a smart gas use service sub-platform and a smart supervision service sub-platform, and the smart gas safety management platform including a smart gas data center and a smart gas pipeline network safety management sub-platform, and the method comprising:

obtaining, based on the smart gas pipeline network equipment object platform, detection information of a gas pipeline in a target area and sending, based on the smart gas pipeline network equipment sensor network platform, the detection information of the gas pipeline in the target area to the smart gas data center;

obtaining the detection information of the gas pipeline in the target area based on the smart gas pipeline network safety management sub-platform from the smart gas data center;

using the smart gas pipeline network safety management sub-platform to:
  determine an abnormal pipeline in the target area by comparing the detection information with reference detection information, wherein the reference detection information includes a gas delivery speed, a temperature and a pressure of a gas pipeline under a normal working condition;
  randomly generate a plurality of initial candidate schemes for the abnormal pipeline based on detection information corresponding to the abnormal pipeline, the plurality of initial candidate schemes including handling parameters of the abnormal pipeline;
  perform a plurality of rounds of iteration updating on the plurality of initial candidate schemes based on a preset algorithm until a preset iteration condition is satisfied;

determine an abnormality handling scheme;

transmitting, based on the smart gas data center, the abnormal pipeline and the abnormality handling scheme to the smart supervision service sub-platform; and transmitting, based on the smart supervision service sub-platform, the abnormal pipeline and/or the abnormality handling scheme to the supervision user sub-platform.

2. The method of claim 1, wherein at least one round of iteration in the plurality of rounds of iteration updating includes:

determining an evaluation value of each first candidate handling scheme of a plurality of first candidate handling schemes, wherein when a count of iteration rounds is equal to 1, the first candidate handling scheme is an initial candidate scheme among the plurality of initial candidate schemes; or when the count of iteration rounds is greater than 1, the first candidate handling scheme is a third candidate handling scheme of a previous round of iteration;

determining second candidate handling schemes from the plurality of first candidate handling schemes based on the evaluation values of the first candidate handling schemes; and determining the third candidate handling schemes by performing transform processing on the second candidate handling schemes.

3. The method of claim 2, wherein the determining an evaluation value of each first candidate handling scheme of a plurality of first candidate handling schemes includes:

determining fitness of the first candidate handling scheme based on processing on attribute information of the abnormal pipeline and the first candidate handling scheme performed by a fitness determination model, the fitness determination model being a machine learning model; and determining the evaluation value of the first candidate handling scheme based on the fitness of the first candidate handling scheme.

4. The method of claim 3, wherein the determining the evaluation value of the first candidate handling scheme based on the fitness of the first candidate handling scheme includes:

constructing a pipeline network diagram of the target area based on the pipeline network information of the target area, nodes of the pipeline network diagram corresponding to intersections or endpoints of the gas pipeline in the target area, and an edge of the pipeline network diagram corresponding to the gas pipeline in the target area;

determining an abnormality evaluation value of the target area corresponding to the first candidate handling scheme based on processing of the pipeline network diagram, the detection information corresponding to the abnormal pipeline, and the first candidate handling scheme performed by an interaction impact prediction model, the abnormality evaluation value being determined based on an abnormality probability value output by and corresponding to the nodes and edges of the pipeline network diagram, the interaction impact prediction model being a machine learning model; and determining the evaluation value of the first candidate handling scheme by combining with the fitness of the first candidate handling scheme and the abnormality evaluation value of the target area corresponding to the first candidate handling scheme.

5. The method of claim 2, wherein the preset iteration condition includes at least one of:

the count of iteration rounds being greater than or equal to a preset round value;

the evaluation value of the first candidate handling scheme being greater than or equal to a preset evaluation value; or a variation value of the evaluation values of the first candidate handling scheme being smaller than a preset variation value in at least two consecutive rounds of iterations.

6. The method of claim 2, wherein the at least one round of iteration in the plurality rounds of iteration updating further includes:

determining reference values of the third candidate handling schemes; and screening the third candidate handling schemes based on the reference values of the third candidate handling schemes, and using the screened third candidate handling schemes as the first candidate handling schemes in a next round or to determine the abnormality handling scheme.

7. The method of claim 2, wherein the transform processing includes a first transform and a second transform, wherein the first transform includes: selecting two second candidate handling schemes from the plurality of second candidate handling schemes, generating at least two third alternative schemes by exchanging one or more handling parameters in the selected two second candidate handling schemes, and determining the third candidate handling schemes based on the third alternative schemes, and the second transform includes: generating the at least one third candidate handling scheme by updating at least one handling parameter in preliminary handling schemes, the preliminary handling schemes being the second candidate handling schemes or the third alternative schemes.

8. A non-transitory computer-readable storage medium storing computer instructions, wherein when reading the computer instructions in the storage medium, a computer implements the method for processing abnormality of the smart gas pipeline network according to claim 1.

9. An Internet of Things (IoT) system for processing abnormality of the smart gas pipeline network comprising a smart gas safety management platform, a smart gas user platform, a smart gas service platform, a smart gas pipeline network equipment sensor network platform, and a smart gas pipeline network equipment object platform, the smart gas user platform including a gas user sub-platform and a supervision user sub-platform, the smart gas service platform including a smart gas use service sub-platform and a smart supervision service sub-platform, and the smart gas safety management platform including a smart gas data center and a smart gas pipeline network safety management sub-platform, wherein the smart gas safety management platform is configured to:

obtain, based on the smart gas pipeline network equipment object platform, detection information of a gas pipeline in a target area and send, based on the smart gas pipeline network equipment sensor network platform, the detection information of the gas pipeline in the target area to the smart gas data center;

obtain the detection information of the gas pipeline in the target area based on the smart gas pipeline network safety management sub-platform from the smart gas data center;

the smart gas pipeline network safety management sub-platform is configured to:

determine an abnormal pipeline in the target area by comparing the detection information with reference detection information, wherein the reference detection information includes a gas delivery speed, a temperature and a pressure of a gas pipeline under a normal working condition;

randomly generate a plurality of initial candidate schemes for the abnormal pipeline based on detection information corresponding to the abnormal pipeline, the plurality of initial candidate schemes including handling parameters of the abnormal pipeline;

perform a plurality of rounds of iteration updating on the plurality of initial candidate schemes based on a preset algorithm until a preset iteration condition is satisfied;

determine an abnormality handling scheme;

transmit, based on the smart gas data center, the abnormal pipeline and the abnormality handling scheme to the smart supervision service sub-platform; and transmit, based on the smart supervision service sub-platform, the abnormal pipeline and/or the abnormality handling scheme to the supervision user sub-platform.

10. The IoT system of claim 9, wherein at least one round of iteration in the plurality of rounds of iteration updating includes:

determining an evaluation value of each first candidate handling scheme of a plurality of first candidate handling schemes, wherein when a count of iteration rounds is equal to 1, the first candidate handling scheme is an initial candidate scheme among the plurality of initial candidate schemes; or when the count of iteration rounds is greater than 1, the first candidate handling scheme is a third candidate handling scheme of a previous round of iteration;

determining second candidate handling schemes from the plurality of first candidate handling schemes based on the evaluation values of the first candidate handling schemes; and determining the third candidate handling schemes by performing transform processing on the second candidate handling schemes.

11. The IoT system of claim 10, wherein the at least one round of iteration in the plurality of rounds of iteration updating further includes:

determining reference values of the third candidate handling schemes; and screening the third candidate handling schemes based on the reference values of the third candidate handling schemes, and using the screened third candidate handling schemes as the first candidate handling schemes in a next round or to determine the abnormality handling scheme.

12. The IoT system of claim 10, wherein the transform processing includes a first transform and a second transform, wherein the first transform includes: selecting two second candidate handling schemes from the plurality of second candidate handling schemes, generating at least two third alternative schemes by exchanging one or more handling parameters in the selected two second candidate handling schemes, and determining the third candidate handling schemes based on the third alternative schemes, and the second transform includes: generating the at least one third candidate handling scheme by updating at least one handling parameter in preliminary handling schemes, the preliminary handling schemes being the second candidate handling schemes or the third alternative schemes.

13. The IoT system of claim 10, wherein the preset iteration condition includes at least one of:

the count of iteration rounds being greater than or equal to a preset round value;

the evaluation value of the first candidate handling scheme being greater than or equal to a preset evaluation value; or a variation value of the evaluation values of the first candidate handling scheme being smaller than a preset variation value in at least two consecutive rounds of iterations.

14. The system of claim 10, wherein the determining an evaluation value of each first candidate handling scheme of a plurality of first candidate handling schemes includes:

determining fitness of the first candidate handling scheme based on processing on attribute information of the abnormal pipeline and the first candidate handling scheme performed by a fitness determination model, the fitness determination model being a machine learning model; and determining the evaluation value of the first candidate handling scheme based on the fitness of the first candidate handling scheme.

* * * * *